May 14, 1940.  J. FERLA  2,200,267
METHOD AND MEANS FOR PRODUCING PIPES OF CEMENTITIOUS MATERIAL
Filed June 6, 1938  2 Sheets-Sheet 1

Inventor:
John Ferla
By: [signature]
Attorney.

May 14, 1940.  J. FERLA  2,200,267
METHOD AND MEANS FOR PRODUCING PIPES OF CEMENTITIOUS MATERIAL
Filed June 6, 1938  2 Sheets-Sheet 2

Inventor:
John Ferla.
By: *Henry Hech*
Attorney.

Patented May 14, 1940

2,200,267

UNITED STATES PATENT OFFICE 2,200,267

METHOD AND MEANS FOR PRODUCING PIPES OF CEMENTITIOUS MATERIAL

John Ferla, Chicago, Ill., assignor to Levi H. Blouch, Merchantville, N. J.

Application June 6, 1938, Serial No. 212,071

7 Claims. (Cl. 25—30)

The invention relates to a method of and means for producing tubes of cementitious composition material, with or without integral bell collars.

It is an object of the invention to provide a novel method and means for producing pipes with or without bell collars from substantially dry cementitious composition material, so as to produce non-porous and highly resistant pipes in an economical and efficient manner.

It is a further object to superpose, under pressure, semi-dry layers of composition material and to entirely dispense with a liquid mixture in the production of tubes of composition material.

Other equally important objects will become apparent from a perusal of the invention, which comprises the steps of a novel method carried out by means described in the following specification, particularly pointed out in the claims forming a part thereof, and illustrated in the more or less diagrammatic views in the drawings, in which:

Figure 1:
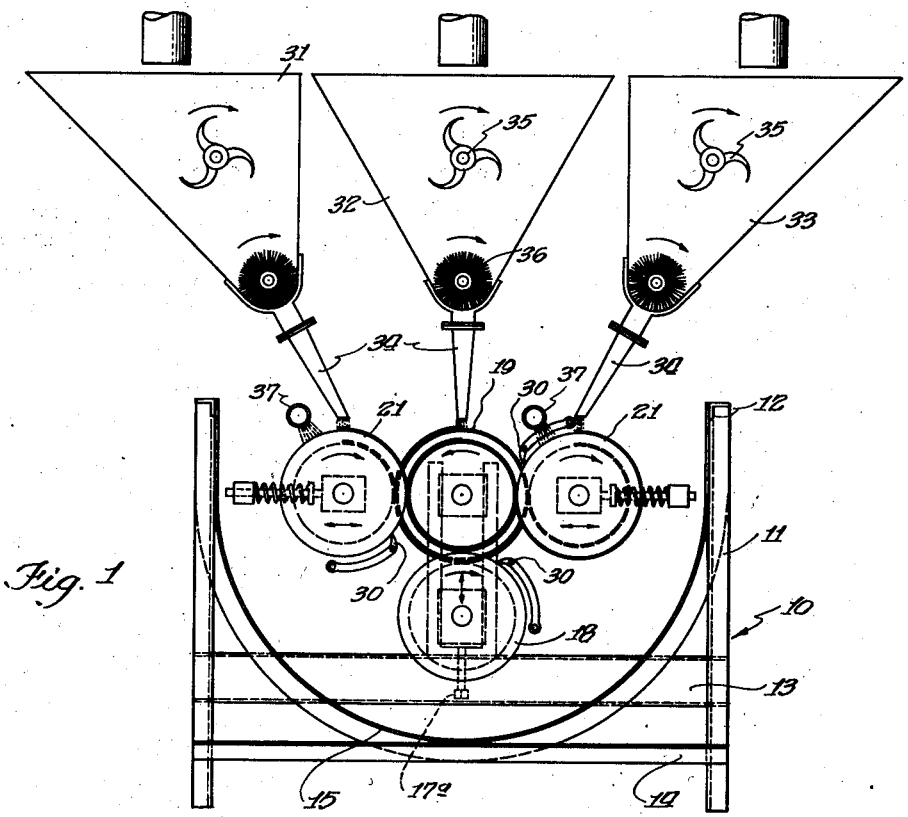
Fig. 1 is an elevational view of an apparatus constructed in accordance with my invention.
Figure 2:
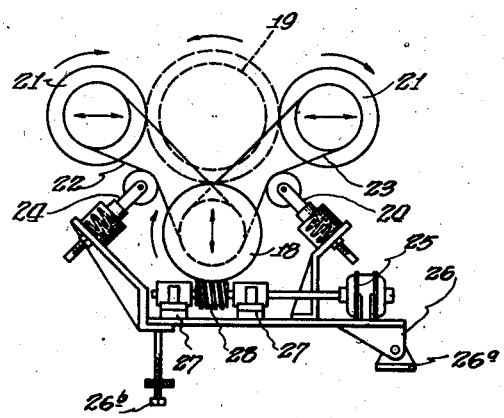
Fig. 2 is a detail view of a drive mechanism.

The apparatus includes a frame structure generally indicated by 10, and composed of upright members 11, which are connected by longitudinal members 12 and cross members 13 and 14.

A semi-circular apron 15 is secured to the frame structure to form a trough into which material, during the molding process of the tubes, may fall and be re-used.

In bearings 16 and 17 (Fig. 3), secured to the frame, the shaft 18a of a carrying and drive roller 18 is journaled, on which rest an accumulating roller or mandrel 19, whose shaft 20 is also journaled in said bearings, which are open at the top so as to afford a floating support for said mandrel.

The mandrel 19 is engaged by two calender rollers 21, which are driven from roller 18, by chains or belts 22 and 23, there being a take up device 24 provided for each belt, whereby the horizontal position of the calender rollers 21 may be varied. Set screws 17a, in bearings 16 and 17, maintain proper contact between rollers 18, 19 and 21.

The drive for the apparatus includes a motor 25 mounted on a base plate 26 adjacent the frame structure, pivotally mounted on a suport 26a and held in position by a set screw 26b. The elongated motor shaft is journaled in bearings 27 and carries a worm 28, meshing with a gear wheel 29, mounted on the shaft 18a of roller 18.

Rollers 18 and 21 are engaged on the surface by a blade 30 to prevent material from adhering to the rollers, after deposit on the mandrel.

Hoppers 31, 32 and 33 are supported above the frame structure, each having a discharge chute 34, capable of discharging dry material onto the mandrel and the calender rollers, respectively.

An agitator 35 in each hopper mixes the material and a feeding roll 36, near the lower end of the hopper, regulates the rate of discharge. The agitators and feeding rolls may be driven from any convenient source of power.

Spray pipes 37 discharge an atomized liquid onto each of the calender rollers, so as to impart a pasty consistency to the material.

Figure 3:
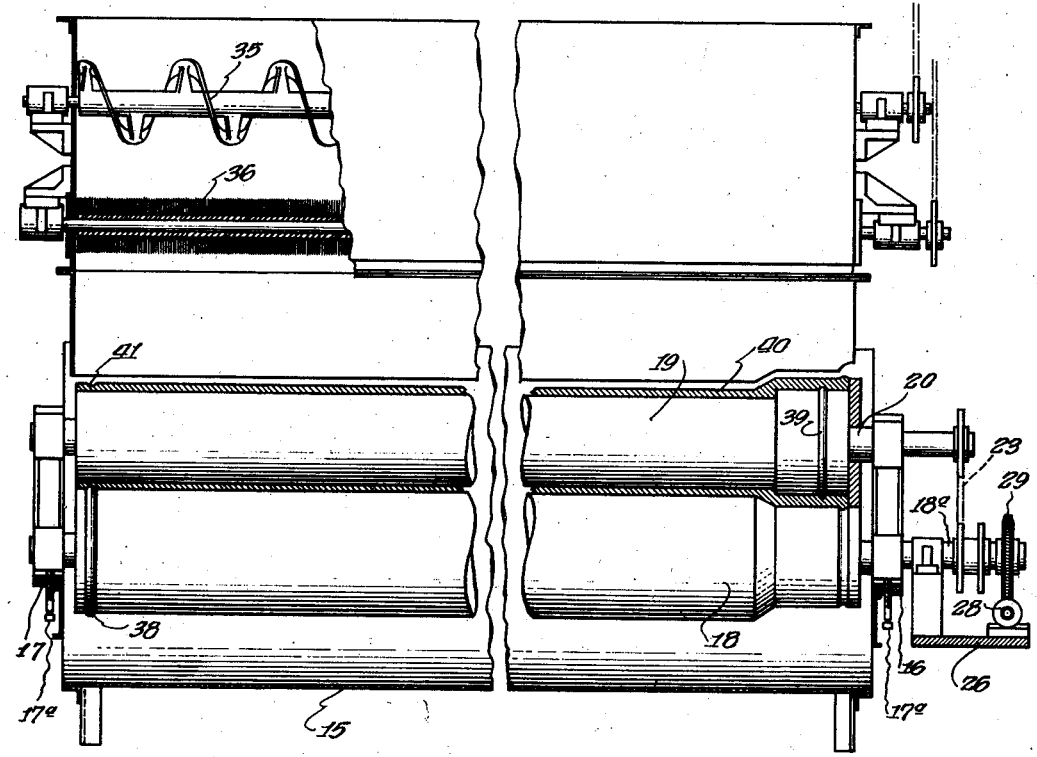
Fig. 3 is a section through the apparatus.
Figure 4:
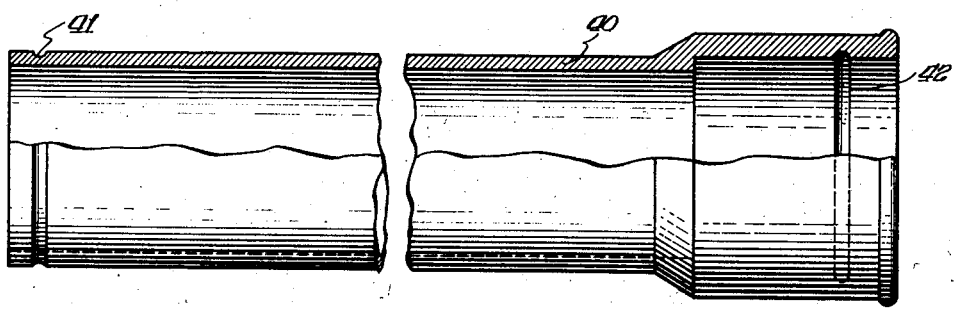
Fig. 4 is a section through a tube made in accordance with my invention.

The mandrel 19, as shown in Fig. 3, is shaped to form tubes with a bell collar. Of course, an ordinary straight tube may be produced, or sheeting may be molded.

The roller 18 is formed near the left end, as viewed in Fig. 3, with an external circumferential bead 38 and, at the right end, the mandrel is provided with a circumferential groove 39, so that the tube 40, when molded, has an external circumferential groove 41 at the left end, and an internal circumferential groove 42, at the right end.

In assembling the pipes, the smaller end of one pipe enters the bell collar end of the adjacent one, so that the grooves 41 and 42 align and a suitable packing for sealing the joint may be introduced.

If desired, one or two of the hoppers may be dispensed with, and only one or two hoppers utilized, in which event the hopper may be arranged for horizontal adjustment to selectively discharge unto either of the calender rollers or the mandrel.

While the drawings show a preferred embodiment of the apparatus for carrying out my novel method, numerous changes may be made, both as to the apparatus and the sequence of steps of the method.

I, therefore, do not limit myself to details of construction, nor the particular sequence of steps, but claim my invention as broadly as the state of the art permits.

I claim:

1. The method of forming cementitious tubes on a mandrel having a bell end, including the steps of feeding dry cementitious material to said mandrel, and superposing on the dry material a layer of moist material to build up a tube comprised of alternate dry and moistened materials.

2. The method of forming cementitious tubes on a mandrel having a bell end, including the steps of feeding dry cementitious material to said mandrel to form a coating thereon, and superposing on the dry coating another coating of moist material under pressure to build up a tube compacted of alternate dry and moistened materials.

3. The method of forming cementitious tubes having a bell end on a mandrel, including the steps of rotating said mandrel, feeding dry cementitious material to said mandrel to form a coating thereon, and applying moist coatings on top of the dry coating, said coatings being compacted to form a tube.

4. The method of forming cementitious tubes on a mandrel under pressure from molding rollers, including the steps of rotating said mandrel and said rollers, feeding dry material to said mandrel to form a coating thereon, and simultaneously superposing by said rollers moist coatings on the dry mandrel coating.

5. The method of forming cementitious tubes on a mandrel under pressure from molding rollers, including the steps of rotating said mandrel and said rollers, feeding dry material to said mandrel and said rollers, and simultaneously moistening the dry material on said rollers only so that the initial dry coating on said mandrel is superposed by moist coatings.

6. Apparatus for forming cementitious tubes, including a mandrel, a plurality of calender rollers cooperating with said mandrel, means for uniformly rotating said mandrel and said rollers, means for feeding dry material to said mandrel and said rollers, and means for simultaneously moistening the material on said rollers to superpose moist coatings on the dry coating of the mandrel.

7. Apparatus for forming cementitious tubes, including a mandrel, a plurality of calender rollers cooperating with said mandrel, means for uniformly rotating said mandrel and said rollers, means for feeding dry material to said mandrel and said rollers, means for simultaneously moistening the material on said rollers to superpose moist coatings on the dry coating of the mandrel, and means for automatically removing the material still adhering to said rollers after contact with said mandrel.

JOHN FERLA.